(12) United States Patent
Linnenbrügger et al.

(10) Patent No.: US 6,293,887 B1
(45) Date of Patent: Sep. 25, 2001

(54) PLATE LINK CHAIN FOR CONTINUOUSLY VARIABLE TRANSMISSION

(75) Inventors: André Linnenbrügger; André Teubert, both of Bühl; Klaus Scheufele, Ottersweier, all of (DE)

(73) Assignee: LuK Lamellen und Kuppungsbau GmbH (DE)

( * ) Notice: Subject to any disclaimer, the term of this patent is extended or adjusted under 35 U.S.C. 154(b) by 0 days.

(21) Appl. No.: 09/498,927

(22) Filed: Feb. 4, 2000

(30) Foreign Application Priority Data

Feb. 6, 1999 (DE) ............................................. 199 04 950

(51) Int. Cl.$^7$ ...................................................... F16H 9/04
(52) U.S. Cl. ............................................. 474/245; 474/18
(58) Field of Search ................... 474/8, 18, 201, 474/206, 214, 215, 216, 217, 242, 245

(56) References Cited

U.S. PATENT DOCUMENTS

| | | | |
|---|---|---|---|
| 3,916,709 | * 11/1975 | Steuer et al. | 474/242 |
| 4,618,338 | * 10/1986 | Rattunde et al. | 474/245 |
| 4,737,137 | * 4/1988 | Miyaishi | 474/245 |
| 5,725,447 | 3/1998 | Friedmann et al. | 474/18 |
| 5,792,013 | 8/1998 | Heinrich et al. | 474/8 |
| 5,879,253 | 3/1999 | Friedmann et al. | 474/18 |

FOREIGN PATENT DOCUMENTS

| | | | |
|---|---|---|---|
| 196 44 167 | * | 5/1997 | (DE) . |
| 0 889 253 | * | 1/1999 | (EP) . |

* cited by examiner

Primary Examiner—Rodney H. Bonck
(74) Attorney, Agent, or Firm—Alfred J. Mangels

(57) ABSTRACT

A plate link chain of the present invention has rocker link elements configured such that the frictional end surfaces have a profile, which deviates from a planar surface in both circumferential and radial orientations. In a preferred embodiment the end surface profiles are defined by radii of predetermined dimensions in the range of 5 to 50 millimeters with the radius formed in the radial plane being larger than the radius formed in the circumferential plane. The radii originate from midpoints, which are located at predetermined distances from the rocking surfaces, to form substantially spherical end surfaces that are either symmetric or asymmetric for selected applications. The substantially spherical end surfaces are designed to reduce the edge transfer forces and tracking error of the rocker link elements and to improve wear characteristics and the stability of frictional engagement of the transmission in operation.

10 Claims, 7 Drawing Sheets

PLATE LINK CHAIN FOR CONTINUOUSLY VARIABLE TRANSMISSION

CROSS REFERENCE TO RELATED APPLICATION

This application claims foreign priority benefits under 35 U.S.C. § 119(a–d) to German patent application 199 04 950.5, filed Feb. 6, 1999 by Dr. André Linnenbrügger, André Teubert, and Klaus Scheufele for an invention entitled Laschenkette ("Plate Link Chain").

BACKGROUND OF INVENTION

1. Field of Invention

The present invention relates generally to improvements in power trains of the type wherein the means for transmitting torque from the rotary output element of an internal combustion engine to a rotary driven element (such as the output shaft of a continuously variable transmission) comprises a torque monitoring sensor integrated with such transmission, in which a plate link chain including a plurality of rocker link elements is trained over a pair of adjustable pulleys or sheaves. More particularly, the present invention relates to improvements in the rocker elements, which interconnect the individual links of the plate link chain, to enhance the stability of frictional engagement of such a transmission over its entire operating range.

Continuously variable transmissions and torque monitoring sensors of the above outlined character are disclosed, for example, in commonly owned U.S. Pat. No. 5,879,253 entitled: "Torque Monitoring Apparatus", filed Nov. 26, 1997 and in commonly owned U.S. Pat. No. 5,725,447 entitled: "Power Train with Infinitely Variable Ratio Transmission", filed Dec. 14, 1995 and are incorporated herein by this reference.

Such continuously variable transmissions typically include parallel pairs of axially movable pulleys or sheaves attached to the driven and output shafts of the transmission, which are actuated by hydraulic piston and cylinder assemblies. The torque sensor is designed to axially shift the adjustable sheaves into frictional engagement with the plate link chain, which is trained over a pair of such parallel sheaves, with a force depending upon the transmitted loads or upon the transmitted torque.

Each sheave or pulley is comprised of a pair of cone-shaped discs or flanges wherein one flange is fixed to the driven and/or output shaft and the other is axially movable relative thereto. The friction surfaces of the flanges are generally conical, but vary from a true geometric cone profile to being slightly curved and/or quasi-spherical in axial cross-section to reduce wear between the plate link chain and the flanges. Further, it is advantageous in some instances to utilize asymmetrical sheaves comprised of confronting flanges with different quasi-sherical profiles to provide optimum wear and tracking characteristics.

The quasi-spherical profile of the flanges is useful in limiting the effects of so-called track misalignment or tracking error, that is, inclined running of the plate link chain that occurs due to the geometry of the flanges being forced into contact with the end surfaces of the rocker link elements in the plate link chain upon making a change in the transmission ratio during operation. The rocker link elements also function to interconnect the individual links of the plate link chain. The end faces of the rocker link elements may be curved and/or partially spherical and are designed to frictionally engage the contact surfaces of the flanges.

It has been shown that the quasi-spherical profile of the flanges and the curved end surfaces of the rocker link elements have different force transfer characteristics as the transmission ratio changes and, particularly when either of the two extreme transmission ratios in the operating range of the transmission are selected. At these operating extremes the rocker link elements transfer forces at their edges only. As a result a very high specific pressure will occur at the contact points between the rocker link elements and the flanges. In high performance transmissions locally excessive wear can result. Pitting at the contact surfaces of the rocker link elements may occur and the surfaces of the flanges will wear prematurely with the danger of hydrodynamic slippage.

Thus, the present invention has been developed to enhance the stability of frictional engagement of a continuously variable transmission in general and, more particularly, to reduce the edge transfer force and to limit the tracking error in the rocker link elements of the plate link chain, to improve the wear characteristics of the rocker link elements, and to overcome other shortcomings of the prior art.

2. Description of Related Prior Art

Continuously variable transmissions and torque sensors of the above outlined character and suitable for use with the present invention are disclosed, for example, in U.S. Pat. No. 5,725,447 to Friedman and in U.S. Pat. No. 5,879,253 to Friedman, et al. The torque sensors, which are disclosed in these prior patents, are designed to establish a clamping engagement between component parts of a torque transmitting apparatus depending upon the load or depending upon the transmitted torque. As a rule such torque sensors function to ensure a frictional engagement between the hydraulically adjustable, sheaves and the rocker link elements of the plate link chain, which are urged towards each other by a force depending upon the transmitted loads or the transmitted torque.

The application of an excessive force for urging these components together results in excessive wear whereas the application of an insufficient force entails slippage and also excessive wear between the sheaves and the rocker link elements of the plate link chain, which are maintained in frictional engagement with one another.

One example of a prior art plate link chain for a continuously variable transmission wherein the friction surfaces of the rocker link elements are essentially part spherical for cooperation with part spherical, cone-shaped surfaces of the such sheaves is disclosed in U.S. Pat. No. 5,792,013 (hereinafter '013 patent). With reference to the ('013) patent drawings, to prevent engagement of the edge regions of the rocker link elements (32, 33) with the respective cone-shaped flanges, contact surface lines (54, 55) located radially outwardly or inwardly, respectively, from a central surface line (49, 53) are inclined by an angle (δ) with respect to the central or base line. The angle of inclination (δ) increases, in positive or negative direction, respectively, starting at such central or base surface line about the intersection with the rocking surfaces (41, 42) in the direction of the cone-shaped surface (44) of the respective cone disk in engagement with the respective rocker link element.

However, this modification of the contour of the end facing friction surface (43) of the rocker link elements in the ('013) patent is provided only in the horizontal (i.e. circumferential) plane defined by the axis (46). In contrast, the present invention provides a substantially spherical or quasi-spherical end surface formed on the rocker link elements defined by two substantially perpendicular radii originating in both the horizontal (i.e. circumferential) and radial planes with respect to the axis of the rocker link element.

SUMMARY OF THE INVENTION

Accordingly, the present invention provides an improved plate link chain for a continuously variable transmission wherein the frictional contact surfaces of the rocker link elements have a profile which deviates from a planar surface in both the horizontal (i.e. circumferential) and radial planes relative to the longitudinal axes of the rocker link elements. The frictional contact surfaces of the rocker link elements are defined by radii machined to predetermined dimensions, which originate at predetermined distances from reference surfaces on the rocker link elements to form generally spherical and/or quasi-spherical contact surfaces for engagement with the pulleys or sheaves of the transmission. It has been shown that when the rocker link elements are modified in accordance with the present invention, the edge transfer forces generated during frictional engagement are substantially reduced, which in turn limits tracking error of the rocker link elements and improves wear characteristics of the components In view of the above, it is an object of the present invention to improve the stability of frictional engagement of a continuously variable transmission in general and thereby obtain improved power and energy transfer by improving the frictional engagement conditions between the plate link chain and the friction surfaces of the sheaves.

Another object of the present invention is to provide an improved plate link chain for a continuously variable transmission in which the frictional surfaces of the rocker link elements are configured such that the edge transfer of forces and tracking error of the rocker link elements are substantially reduced and/or effectively eliminated.

Another object of the present invention is to provide an improved plate link chain for a continuously variable transmission wherein the frictional surfaces of the rocker link elements have a profile deviating from a planar surface and being defined by predetermined radii in both horizontal (i.e. circumferential) and radial orientations relative to the longitudinal axis of the rocker link elements.

Another object of the present invention is to provide an improved plate link chain for a continuously variable transmission wherein the rocker link elements interconnect the individual chain links by means of an anti-rotation device formed therein which positively locks the rocker link elements to their corresponding chain links. Other features and technical advantages of the present invention will become apparent from a study of the following description and the accompanying drawings.

BRIEF DESCRIPTION OF THE DRAWINGS

The novel features of the present invention are set forth in the appended claims. The invention itself however, as well as other features and advantages thereof will be best understood by reference to the following detailed description of an illustrative embodiment when read in conjunction with the accompanying figures, wherein:

FIG. 6 taken collectively is comprised of partial, radial sectional views illustrating the rocker link elements of FIG. 5 in respectively different positions wherein:

FIG. 9 taken collectively are partial, longitudinal section views of alternative embodiments of a rocker link element modified in accordance with the present invention wherein:

DETAILED DESCRIPTION OF THE PREFERRED EMBODIMENT

Figure 1:
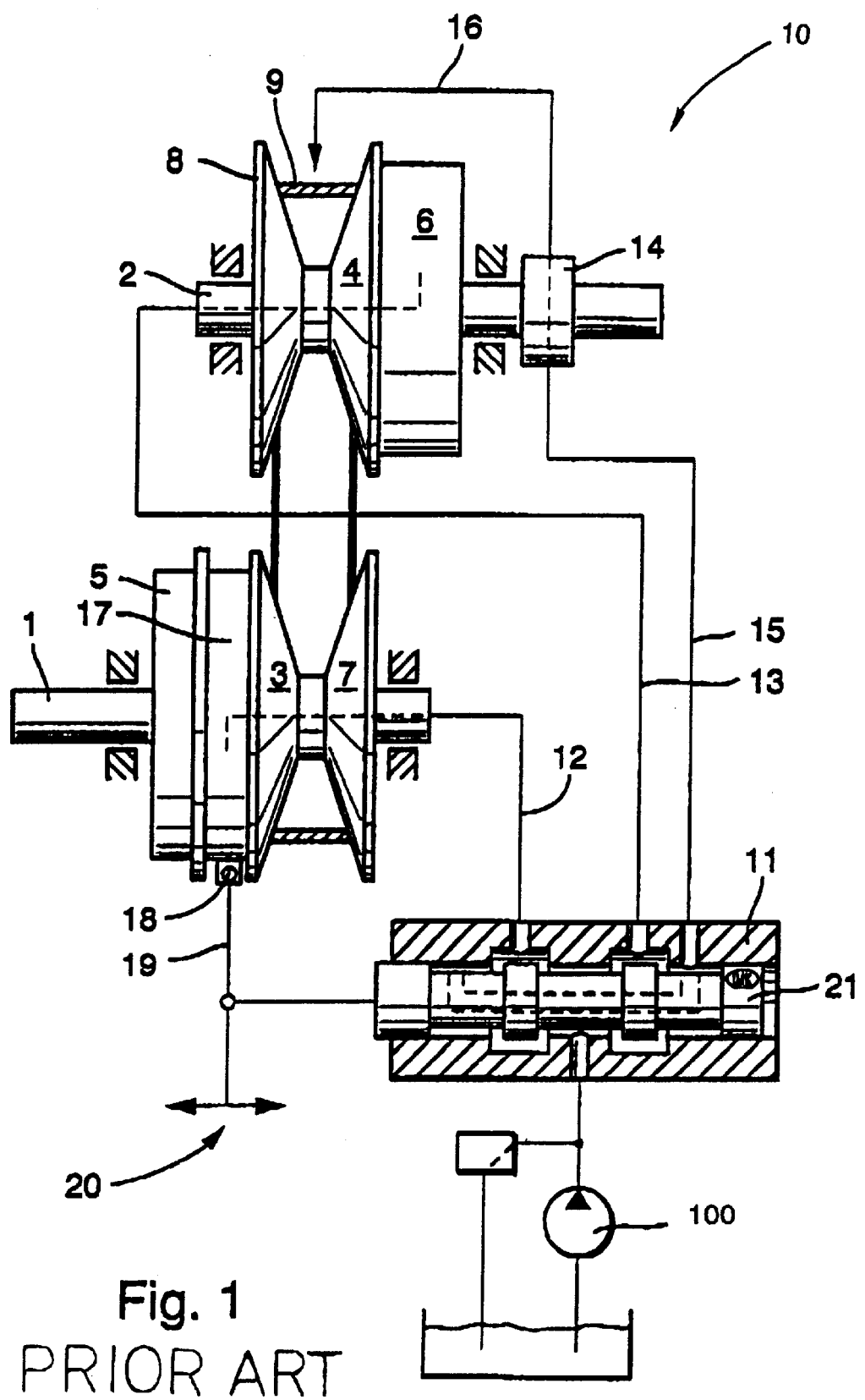
FIG. 1 is an abbreviated schematic representation of a hydraulically controlled continuously variable transmission of the PRIOR ART wherein the improved plate link chain of the present invention is utilized.

Prior to describing the present invention in detail, it may be beneficial to briefly review the structure and operation of a conventional continuously variable transmission insofar as necessary for an understanding of the present invention Referring to FIG. 1 there is shown therein a schematic view of a hydraulically controlled continuously variable transmission, indicated generally at 10 and labeled Prior Art. The transmission 10 includes a pair of adjustable pulleys or sheaves being coupled to an output shaft 1 and a driven shaft 2 disposed in parallel relation. The adjustable sheaves are comprised of cone-shaped discs or flanges 3, 7 and 4, 8 respectively which are coaxially mounted on the output and driven shafts 1 and 2. The flanges 3, 4 together with the piston/cylinder assemblies 5, 6 are coupled to the fixed, rotatably supported flanges 7, 8. A plate link chain 9 including a plurality of steel plate links is trained over and extends between the sheaves comprised of the flange pairs 3, 7 and 4, 8.

The piston/cylinder assemblies 5, 6 receive hydraulic fluid under pressure from a pressure source or pump 100 over a four-control spool valve 11 and hydraulic lines 12 and 13. The driven shaft 2 is mechanically coupled to a torque sensor 14, which receives hydraulic fluid from line 15 in fluid communication with the valve 11. The flow of this fluid is throttled in correspondence with the torque being transmitted. Excess hydraulic fluid is delivered through line 16 without pressure and used for lubrication of the chain 9.

The throttled fluid also controls the pressure on the drive piston/cylinder assembly 5. The piston/cylinder 5 includes a circumferential groove 17 formed therein. A so-called slider 18 slides in the groove 17 and is mechanically coupled to a lever 19 of a transmission control element or handle 20. The lever 19 is also linked to control the spool 21 of the spool valve 11.

Since the operation and function of such continuously variable transmissions are well known to those skilled in the art, further detailed discussion of the same is not deemed necessary, and reference is made to the disclosure in the aforementioned commonly owned U.S. Pat. Nos. 5,879,253 and 5,725,447.

Figure 2:
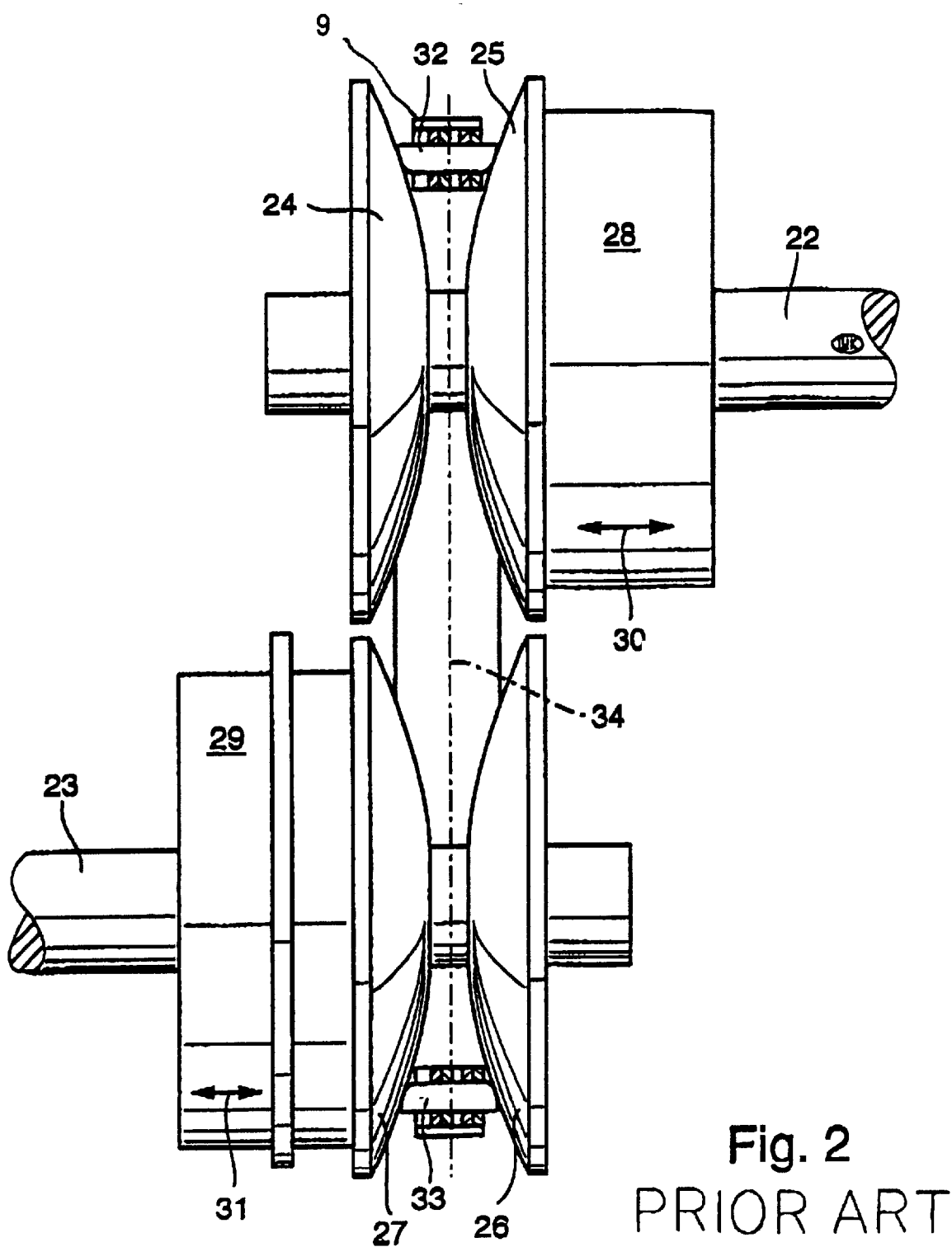
FIG. 2 is an enlarged, simplified view of the PRIOR ART transmission of FIG. 1 showing the quasi-spherical friction surfaces of the sheave flanges and the partially spherical engagement surfaces of the rocker link elements.

For purposes of explanation of the present invention, such a continuously variable transmission is further illustrated in an enlarged view in FIG. 2 in which four cone-shaped discs or flanges 24–27 with quasi-spherical surfaces are shown affixed to shafts 22 and 23 respectively in rotatable engagement therewith. The flanges 24 and 26 are axially secured on their respective shafts whereas the flanges 25, 27 integrated with the piston/cylinder assemblies 28, 29 are axially shiftable as indicated by directional arrows 30, 31 but also rotatable with the shafts 22, 23. The plate link chain 9 is trained over and runs between the flanges 24–27.

In the neutral or base setting of the transmission ratio setting of 1:1, the chain 9 is disposed along a base or centerline 34 as seen in FIG. 2. Rocker link elements 32 and 33 have opposite end surfaces, which engage the adjacent contact surfaces of the flanges 24–27 respectively.

Still referring to FIG. 2, it can be seen that the contact surfaces of the flanges 24–27 are generally conical in axial cross-section, but deviate from a true geometric cone being partly spherical and/or quasi-spherical. Similarly, the opposed end surfaces or faces of the rocker link elements 32, 33 have an essentially semicircular or, rather, a partly spherical outer surface.

Figure 3:
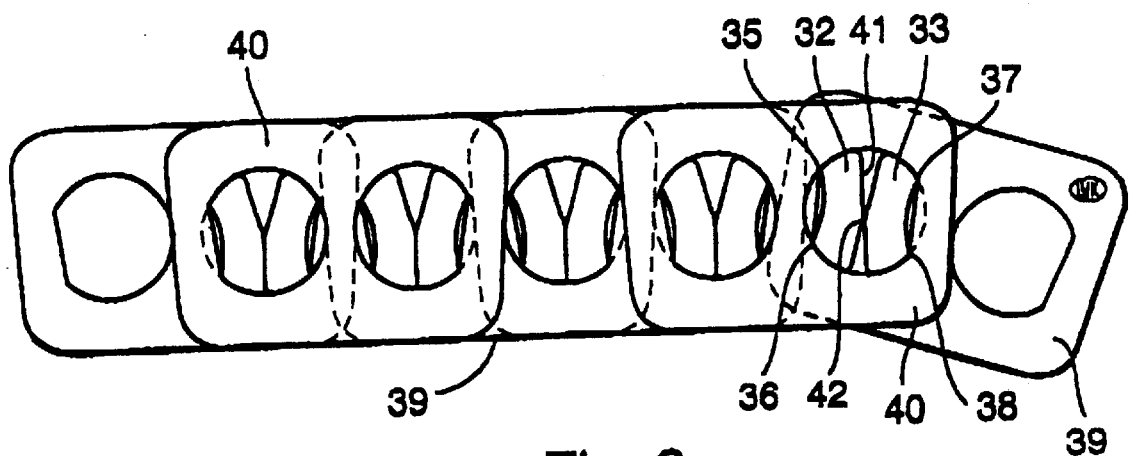
FIG. 3 is a side elevational view of a PRIOR ART plate link chain showing numerous pairs of rocker link elements within a plurality of individual chain links.

Referring now to FIG. 3 there is shown therein a detailed side view of the plate link chain 9 wherein the end faces of the rocker elements 32 and 33 are shown. It will be appreciated that the scale of FIG. 3 is enlarged with respect to the figures described hereinabove. The rocker link elements are shaped such that they engage at two positions, as at 35, 36 and 37, 38 in openings formed in the plate links of the respectively associated links 39 and 40. Further, the rocker link elements 32, 33 are secured against rotation with respect to the associated plate links 39 and 40.

Figure 4:
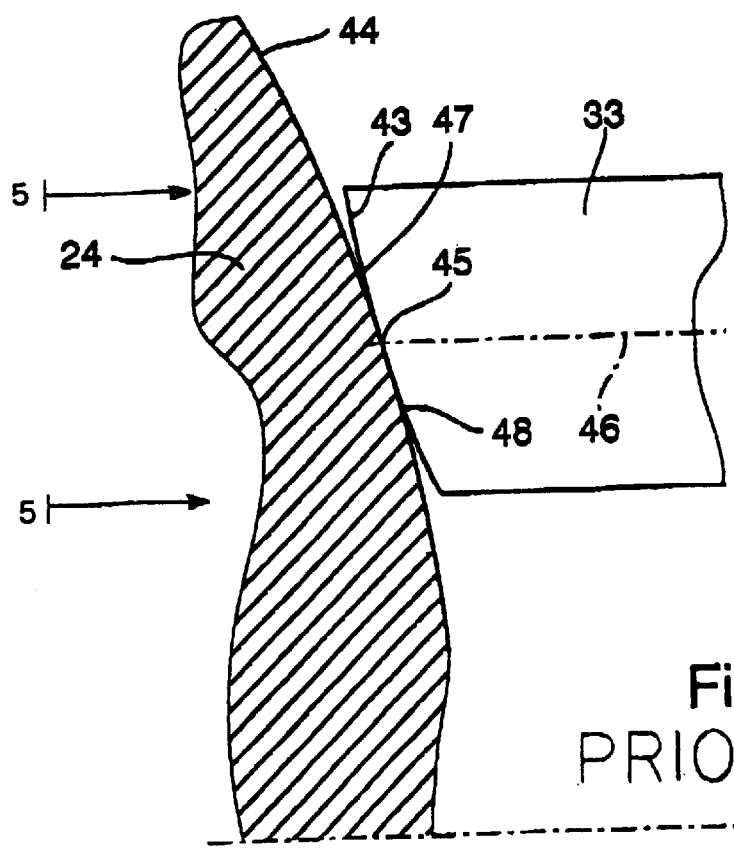
FIG. 4 is a highly enlarged, partial sectional view showing engagement between the friction surface of a sheave flange with the end surface of a rocker link element and labeled PRIOR ART.

The connecting rocker link elements 32 and 33 are supported against each other for rocking movement over the generally convex shaped rocking surfaces 41 and 42. The rocking surfaces 41 and 42 permit the rocker link elements 32, 33 to roll off against each other when the chain links 39, 40 shift from their straight line, aligned position as depicted at the center of FIG. 3 into the angulated position shown at the right side of FIG. 3. The movement of the chain 9 in which the links 39, 40 are aligned on the one hand and then angulated with respect to each other occurs as the chain 9 runs through the gap between the confronting flanges 24, 25 and 26, 27. The rocker link elements 32, 33 within each pair continuously shift position and roll off each other as the spacing between the flanges 24–27 changes depending upon the engagement radius of the flanges 24 with the respective rocker link elements 32, 33 during operation FIG. 4 is an enlarged fragmentary view of FIG. 2 which illustrates the engagement of one side of a rocker link element 33 with a flange 24. It will be seen that the rocker link element 33 has a generally curved and/or partly spherical end surface 43 and, similarly, the flange 24 has a curved and/or quasi-spherical friction surface 44 in cross-section FIG. 4 clearly demonstrates that these two components of the transmission (i.e. the rocker link element 33 and the flange 24) are frictionally engaged at a contact position 45. The curvature of the engagement surface 43 of the rocker link element 33 is such that in the radial direction of the flange 24 adjacent parallel level lines are perpendicular to the longitudinal axis 46 of the rocker link element 33 respectively.

FIG. 4 also illustrates two additional possible contact positions. The contact position as at 47 is associated with a smaller operating radius of the flange 24, and it follows that the contact position as at 48 is associated with a larger radius of engagement.

Figure 5:
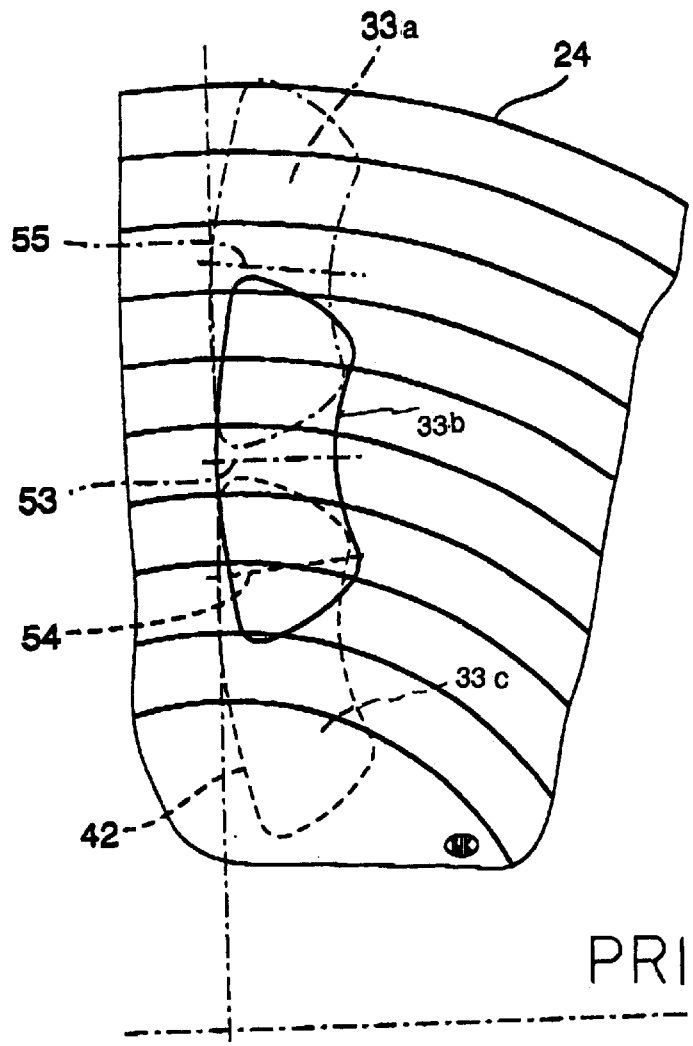
FIG. 5 is a schematic view of taken along line 5—5 of FIG. 4 illustrating sequential rocker link elements in different positions and labeled PRIOR ART.

FIG. 5 shows the subject matter of FIG. 4 in a composite view, if one considers the cone-shaped disc or flange 24 to be transparent looking from the left side through such a transparent flange 24. FIG. 5 depicts three pivoting positions of a rocker link element 33, shown highly enlarged and representing three different positions of the plate link chain 9 corresponding to three different speeds of the transmission. To better illustrate these different positions, a rocker link element 33b corresponding to a base or central position wherein the transmission is operating at approximately a 1:1 ratio is depicted in solid outline in FIG. 5. Accordingly, the position of a rocker link element 33 associated with a larger operating radius of the plate link chain is shown at 33a in chain-dotted outline, and the position shown in broken outline as at 33c is associated with a smaller operating radius on the flange 24.

Figures 6A, 6B, 6C:
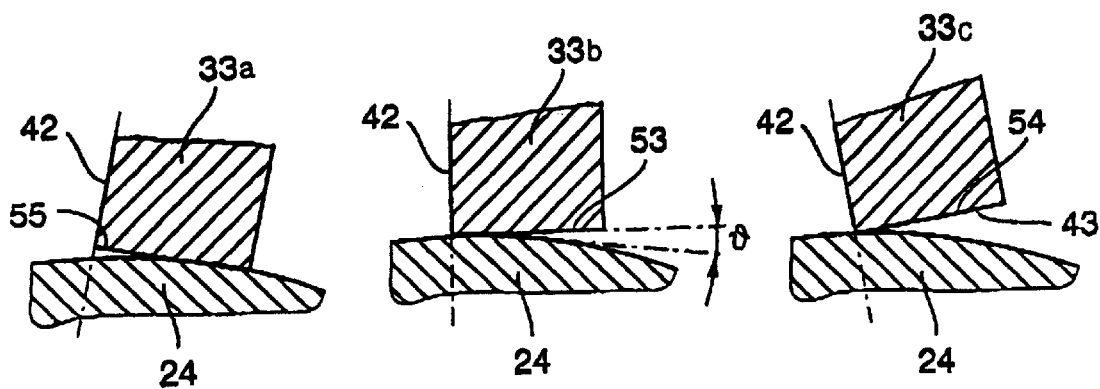
FIG. 6A corresponds to the rocker link element position of rocker link element 33a shown in chain-dotted representation in FIG. 5, FIG. 6B corresponds to the rocker link element 33b shown in fill-line position in FIG. 5, and FIG. 6C to the rocker line element 33c shown in broken-line position in FIG. 5.

These three pivoting positions of the rocker link element 33a–33c in accordance with FIG. 5 are represented in FIG. 6 collectively and side-by-side to illustrate the engagement between the flange 24 and the respective rocker link elements. The illustrations in FIGS. 6A–6C are approximate radial sectional views and seen perpendicular to the lines 53, 54, and 55 of FIG. 5 wherein the lines 55, 53, and 54 illustrate a larger, a central or average, and a smaller degree of curvature of the flange 24 respectively in a radial direction. More particularly, line 53 represents a level planar section taken through the contact point 45 as shown in FIG. 4. Similarly, the lines 54 and 55 represent planar sections taken through the respective contact points 47 and 48 as shown in FIG. 4.

Referring now to FIG. 6A, which corresponds to a larger operating radius as described hereinabove, it will be seen that the friction surface 43 of the rocker link element 33a is located within the region of the outer edge and opposite to the rocking surface 41 as seen in FIG. 3. The position of the rocker link element 33b shown in solid outline in FIG. 5 and as further represented in FIG. 6B shows that the friction surface 43 of the rocker link element 33 lies close to the rocking surface 41 (see FIG. 3). FIG. 6C, which corresponds to the position as at 33c for a smaller operating radius of the rocker link element, illustrates that the friction surface 43 lies entirely at the edge common to the rocking surface 41 (see FIG. 3). The same situation, of course, obtains with respect to the rocking surface 42, which is shown in FIGS. 6A–6C. It will be understood that FIGS. 6A–6C are highly exaggerated; for example, a comparison of FIG. 6A to FIG. 6C demonstrates that the friction surface 43 of the rocker link element 33 provides only a comparatively small surface area for frictional transfer force. Of course, this small surface area will be especially highly loaded.

It is known in the prior art to modify the end surfaces 43 of the rocker link elements 33 such that the contact positions on the right and left edges of the rocker link elements 33 are shifted to the center thereof. The end surface line associated with the respective contact positions is essentially tangential to the associated running circumference of the cone-shaped flange 24 as seen in FIG. 6B, and is shifted about the angle δ. This modification of the end surfaces 43 is further illustrated in FIG. 7 and labeled Prior Art. For purposes of illustration the cone-shaped flange 24 has been omitted from FIG. 7. The perspective view of FIG. 7 demonstrates that at the line 49, which corresponds to a 1:1 transmission ratio, there is no shift or tilt of the contact line with respect to a theoretical line from perpendicular to the longitudinal axis 46 of the respective rocker link element 33. Starting at this central or base line 49 corresponding to the transmission ratio 1:1, the tilt or shift increases in the direction of the flange radially outwardly. This shift is such that over the shifted region, the radially outwardly directed shift or inclination will be effective at smaller operating radii with respect to those in which the line 49 controls the transmission ratio. Conversely, and starting from line 49, a negative shift is used for radial inward operation of the element 33, which is used within the range suitable for large operating radial of the flange 24. With respect to a known end surface 50 of the prior art shown schematically in FIG. 7 for comparison, the course of the edge of the facing surface is illustrated by line 51, starting from a common edge 52. The resulting surface ensures that the contact surfaces will always be in a median or central portion between the outer edges of the rocker link elements 33 considering the direction of operation of the plate link chain. Thus, the contact surfaces will have sufficient support in the material of the rocker link elements 33.

Figure 7:
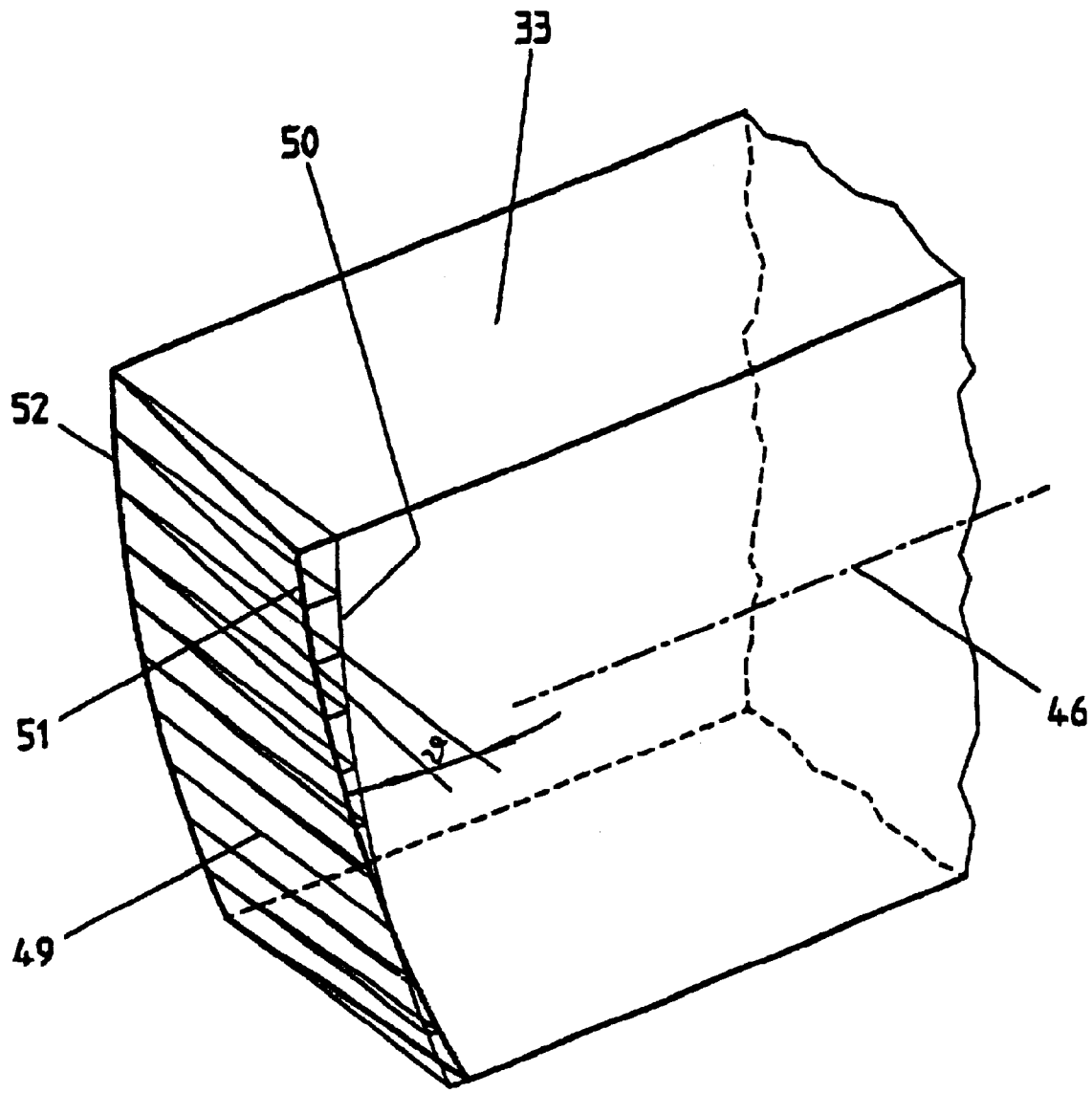
FIG. 7 is a perspective schematic and enlarged view of an end portion of a rocker link element of the PRIOR ART.
Figure 8:
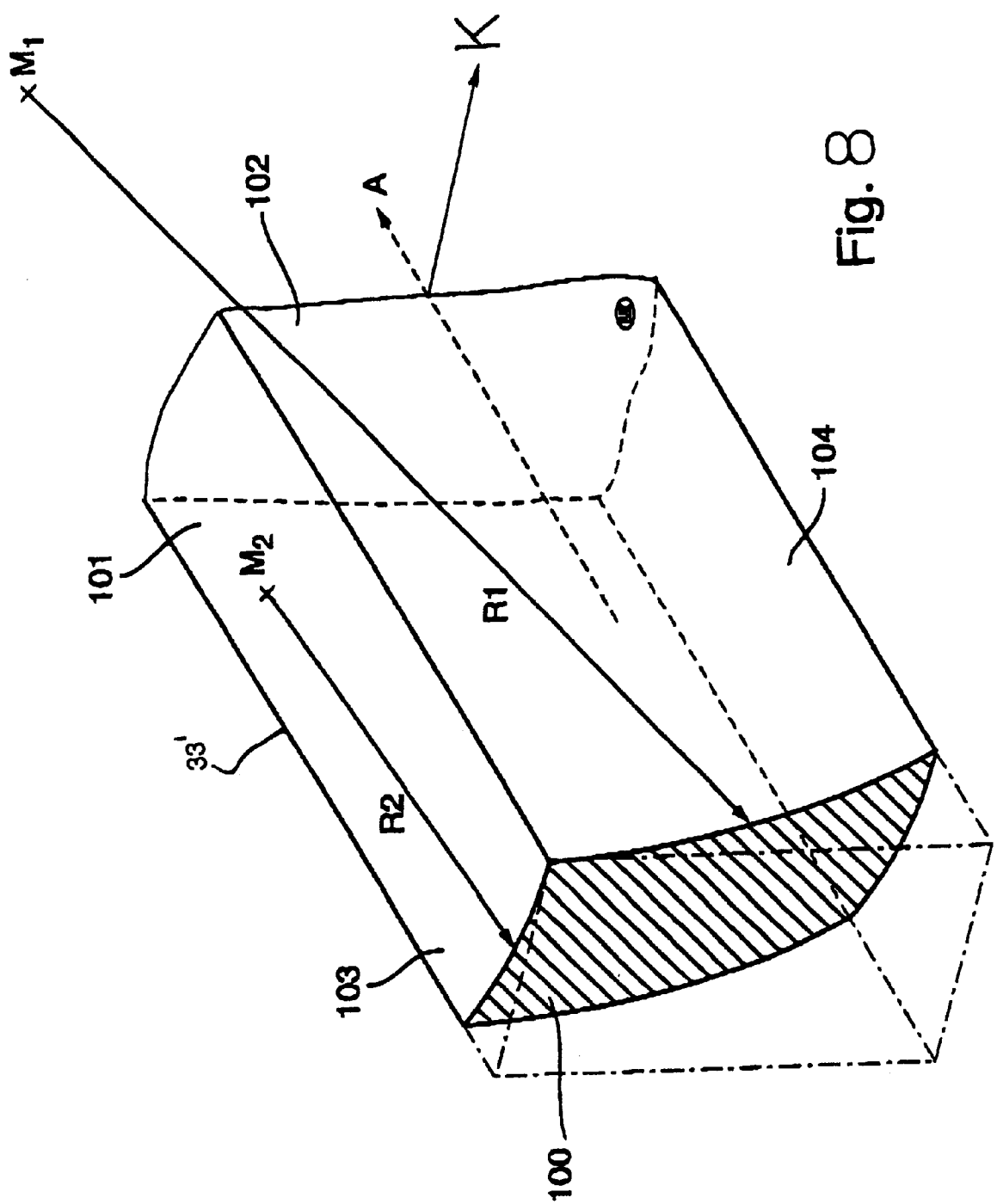
FIG. 8 is a perspective schematic and enlarged view of an end portion of a rocker link element in which the end surfaces thereof are modified in accordance with the present invention.

With reference to FIG. 8, an improved rocker link element 33' in accordance with the present invention will now be described in detail. In comparison to the rocker link element 33 of the prior art wherein the radially outwardly directed shift or inclination of the end surfaces 43 is defined by the angle δ as shown in FIG. 7, the profile of the contact surfaces of the rocker link element 33' of the present invention is produced by forming a first semicircular or quasi-spherical surface in the horizontal and/or circumferential plane of the rocker link element 33' such that this contact surface engages the flanges 24 with the plate link chain running in the direction indicated by directional arrows as at K. In addition, the rocker link element 33' is modified by forming a second semicircular or quasi-spherical contour in a radial orientation and substantially perpendicular to the first semicircular surface as hereinafter described. Such quasi-spherical end surfaces of the rocker link elements 33' are formed by conventional grinding machine equipment or other known manufacturing processes.

FIG. 8 illustrates that an end surface 100 of the rocker link element 33' has a substantially spherical or quasi-spherical profile defined by a radius R1 in the radial direction and a radius R2 on a perpendicular plane A, K. In the embodiment shown in FIG. 8 it will be seen that the radius R1 is larger than the radius R2 with both radii being in the range of 5 to 50 millimeters (mm) and preferably in the range of 10 to 50 mm.

Further, it will be understood that the mid-points of the radii R1, R2 are not necessarily centric to the rocker link element 33'. For example, in the embodiment shown the mid-point M2 lies closer to one of the side surfaces 101, 102 of the rocker link element than to the other side surface. In an alternative embodiment the mid-point M2 can be positioned equidistant from the side surfaces 101, 102.

Similarly, it can be seen that the mid-point M1 of the radius R1 is located closer to the top surface 103 of the rocker link element 33' than to the bottom surface 104. In an alternative embodiment the mid-point M1 can be located equidistant from the top and bottom surfaces 103, 104.

Figure 9A:
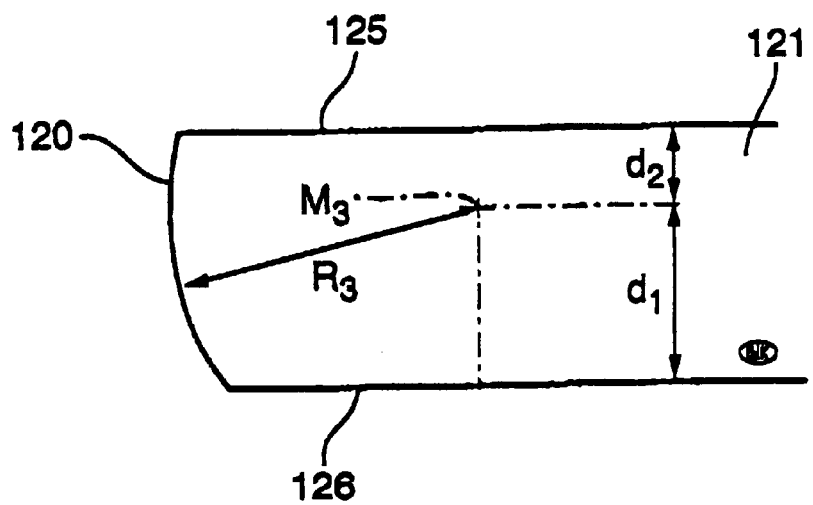
FIG. 9A represents a rocker link element having an asymmetric frictional contact surface defined by the radius R3 in the plane shown.

FIG. 9A shows a partial longitudinal section of an alternative embodiment of a rocker link element 121 of the present invention taken through the plane A, K. It can be seen that the semicircular end surface 120 of the element 121 in the plane shown is defined by the radius R3 having a mid-point M3, which is located at a distance d1 from the side surface 126 and at distance d2 from the side surface 125. It will be seen that the distance d1 is greater than the distance d2 resulting in the asymmetric form of the contact surface 120 of the rocker link element 33'.

Figure 9B:
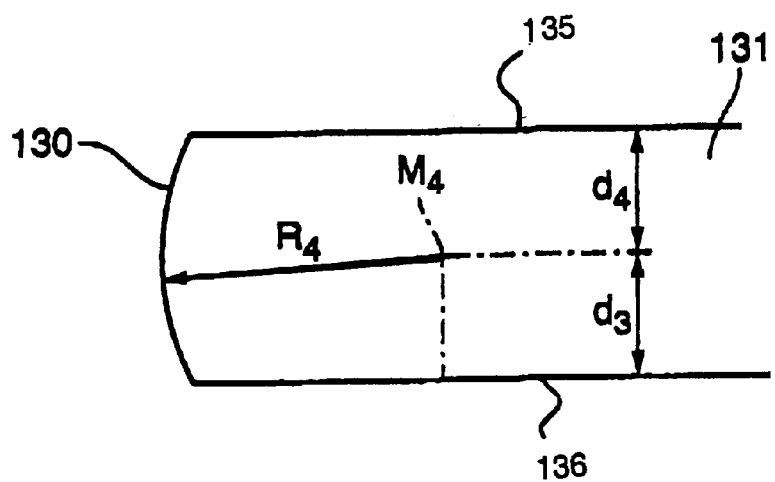
FIG. 9B represents a rocker link element having a symmetric frictional contact surface defined by the radius R4 in the plane shown.

FIG. 9B shows a partial longitudinal section of an alternative embodiment of a rocker link element 131 of the present invention taken through the plane A, K. It can be seen that the semicircular end surface 130 of the element 131 in the plane shown is defined by the radius R4 having a mid-point M4, which is located at a distance d3 away from the side surface 136 and at a distance from the side surface 135. It can be seen that in this embodiment that the distance d3 is equal to the distance d4 resulting in the symmetrical form of the contact surface 130.

Figure 9C:
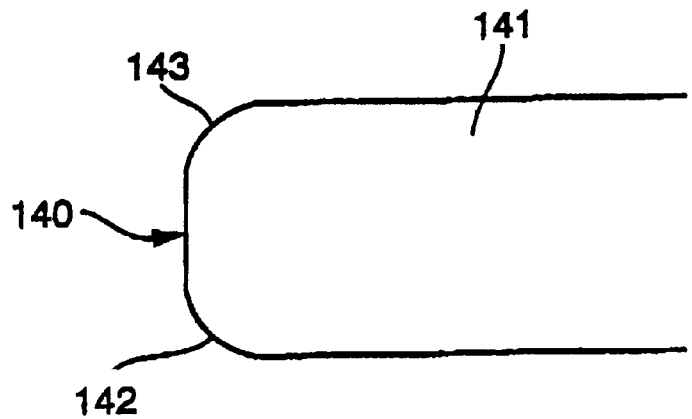
FIG. 9C represents a rocker link element having a flat frictional contact surface with radii formed at the corner edges thereof

FIG. 9C shows a partial longitudinal section of yet another alternative embodiment of a rocker link element 141 of the present invention taken through the plane A, K. In this embodiment the element 141 includes a contact surface 140 that is straight and/or flat in the plane shown with radiused corner edges as at 142 and 143. The corner radii formed at 142, 143 vary within a range proportionate to the dimensions of the rocker link element.

It will be understood that each of the alternative embodiments described hereinabove and illustrated in FIGS. 9A–9C also include a semicircular contour formed in the radial direction perpendicular to the plane A, K and defined by the radius R1, for example, as described with reference to FIG. 8 hereinabove.

Thus, the combination of the semicircular end surfaces defined by the radii R1 and R2 as shown in FIG. 8 or, alternatively, R1 and R3 or R1 and R4 as depicted in FIGS. 9A–9C results in the generally spherical and/or quasi-spherical contact surfaces of the rocker link elements 33' and the improved plate link chain of the present invention.

Although not specifically illustrated in the drawings, it should be understood that additional equipment and structural components will be provided as necessary and that all of the components above are arranged and supported in an appropriate fashion to form a complete and operative plate link chain incorporating features of the present invention.

It is also understood that variations may be made in the present invention without departing from the scope of the invention. Moreover, although illustrative embodiments of the invention have been described, a latitude of modification, change, and substitution is intended in the foregoing disclosure, and in certain instances some features of the invention will be employed without a corresponding use of other features. Accordingly, it is appropriate that the appended claims be construed broadly and in a manner consistent with the scope of the invention.

What is claimed is:

1. An improved plate link chain for a continuously variable transmission including parallel pairs of axially adjustable sheaves comprised of confronting, cone-shaped flanges capable of being shifted into frictional engagement with said plate link chain which is trained over said sheaves, said chain being constructed of a plurality of individual chain links each being interconnected by pairs of rocker link elements having longitudinal axes and extending transversely between said links, said rocker link elements being concave/convex in axial cross-section having convex rocking surfaces and opposed end surfaces adapted for frictional engagement with said flanges during operation of said transmission, said improvements comprising:

modified rocker link elements including at least one end surface having a profile deviating from a planar surface in both horizontal and radial orientations relative to said axes thereby providing reduced edge transfer forces and tracking error during frictional engagement with said flanges.

2. The improved plate link chain of claim 1 wherein said profile is defined by radii of predetermined dimensions formed on said end surfaces in each of said horizontal and said radial orientations.

3. The improved plate link chain of claim 2 wherein said radii measure in the range of 5 to 50 millimeters.

4. The improved plate link chain of claim 3 wherein said radius in said radial orientation is larger than said radius in said horizontal orientation.

5. The improved plate link chain of claim 2 wherein said radii originate from midpoints thereon located at predetermined distances from said rocking surfaces.

6. The improved plate link chain of claim 5 wherein said at least one end surface is asymmetrical.

7. The improved plate link chain of claim 1 wherein said at least one end surface is substantially spherical in configuration.

8. An improved plate link chain for a continuously variable transmission including parallel pairs of axially adjustable sheaves comprised of confronting, cone-shaped flanges capable of being shifted into frictional engagement with said plate link chain which is trained over said sheaves, said chain being constructed of a plurality of individual chain links each being interconnected by pairs of rocker link elements having longitudinal axes and extending transversely between said links, said rocker link elements being concave/convex in axial cross-section having convex rocking surfaces and opposed end surfaces adapted for frictional engagement with said flanges during operation of said transmission, said improvements comprising:

modified rocker link elements including at least one end surface having a profile substantially conforming to a planar surface in a circumferential orientation and deviating from a planar surface in a radial orientation relative to said axes thereby providing reduced edge transfer forces during frictional engagement with said flanges during operation of said transmission.

9. The improved plate link chain of claim 8 wherein said profile is defined by radii of predetermined dimensions formed on said at least one end surface in said radial orientation.

10. The improved plate link chain of claim 9 wherein said radii measure in the range of 5 to 50 millimeters.

* * * * *